United States Patent [19]

Gresser et al.

[11] Patent Number: 5,512,218

[45] Date of Patent: Apr. 30, 1996

[54] METHOD OF MAKING BIOPOLYMER-BASED NONLINEAR OPTICAL MATERIALS

[75] Inventors: Joseph D. Gresser, Brookline; Debra J. Trantolo, Princeton; Donald L. Wise, Belmont, all of Mass.; Gary E. Wnek, Latham, N.Y.

[73] Assignee: Cambridge Scientific, Inc., Belmont, Mass.

[21] Appl. No.: 217,312

[22] Filed: Mar. 24, 1994

[51] Int. Cl.$^6$ .............................. B29D 11/00; G02F 1/37
[52] U.S. Cl. .................. 264/1.34; 252/585; 264/1.36; 264/435; 264/299; 385/122; 385/141
[58] Field of Search .................. 264/1.34, 1.36, 264/22, 24, 25, 26, 216, 299, 435; 385/122, 141, 143, 145; 252/299.01, 582, 585

[56] References Cited

U.S. PATENT DOCUMENTS

| | | |
|---|---|---|
| 3,790,251 | 2/1974 | Wysocki et al. . |
| 4,600,526 | 7/1986 | Gallot et al. . |
| 4,743,675 | 5/1988 | Watanabe ................................ 528/328 |
| 4,806,858 | 2/1989 | Elbicki .................................... 324/205 |
| 4,859,753 | 8/1989 | Gallot et al. . |
| 4,939,666 | 7/1990 | Hardman ................................ 364/496 |
| 4,975,237 | 12/1990 | Brown .................................... 356/338 |
| 4,999,809 | 3/1991 | Schildkraut et al. .................. 365/106 |

(List continued on next page.)

FOREIGN PATENT DOCUMENTS 171017  2/1986  European Pat. Off. ................. 264/22

OTHER PUBLICATIONS

Samulski and Tobolsky, Macromolecules, vol. 1, No. 6, Nov.–Dec. pp. 555–557 (1968).
Toth, W. J., Tobolsky, A. V. "Electric Field Orientation of Concentrated Solutions of Poly (γ–Benzyl L–Glutamate)", Polymer Letters, vol. 8, pp. 531–536 (1970).
Oshima et al., Conducting Polypeptide: Poly(L–Histidinium 7,7,8,8–Tetracyanoquinodimethanide), Journal of Polymer Science, 25:2343–2350, (1987).
Chidsey et al., Electroactive Polymers and Macromolecular Electronics, Science, 231:25–31 (1986).
Wnek, Gary E., Electrically Conductive Polymers, Rensselaer Polytechnic Institute, Troy, NY, 1–10.
Cowan et al., The Organic Solid State . . . , C&EN, 28–45 (1986).
Epstein et al., Linear–Chain Conductors, 52–61.
Suh et al., On the Iodine Doping of Non–Conjugated Polymers, Rensselaer Polytechnic Institute, Troy NY.
Marcher et al., A Helical Poly(amino acid) Having Carbazole Side Chains . . . , American Chemical Society, 21:677–686 (1988).
Viney et al., Optical Microscopy of Banded Structures in Oriented Thermotropic Polymers, Journal of Materials Science, 18:1136–1142 (1983).
Kiss et al., Rheo–Optical Studies of Liquid Crystalline Solutions of Helical Polypeptides, Mol. Cryst. Liq. Cryst., 60:267–280 (1980).
Donald et al., Electron Microscopy of Banded Structures in Oriented Thermotropic Polymers, Journal of Materials Science, 18:1143–1150 (1983).
Donald et al., Banded Structures in Oriented Thermotropic Polymers, Polymer, 24:155–159 (1983).

Primary Examiner—Mathieu D. Vargot
Attorney, Agent, or Firm—Weingarten, Schurgin, Gagnebin & Hayes

[57] ABSTRACT

A biopolymer film and other materials that exhibit nonlinear optical (NLO) properties and a method for making this film. Alignment of biopolymer molecules, which is required for NLO phenomena, is achieved by application of an electric field parallel to the surface of a biopolymer solution as the film is formed. In one embodiment, a solution of poly(γ-benzyl-L-glutamate), PBLG, in methylene chloride is employed. Upon application of an electric field, laminar structures perpendicular to both the field direction and to the film surface are formed. These ordered structures are captured in the film upon evaporation of the biopolymer solvent.

6 Claims, 9 Drawing Sheets

U.S. PATENT DOCUMENTS

| | | | |
|---|---|---|---|
| 5,023,139 | 6/1991 | Birnboim et al. | 428/402 |
| 5,064,590 | 11/1991 | Marinaccio | 264/102 |
| 5,097,016 | 3/1992 | Ishii et al. | |
| 5,116,782 | .5/1992 | Yamaguchi et al. | 437/172 |
| 5,184,323 | 2/1993 | Schildkraut et al. | 365/124 |
| 5,247,602 | 9/1993 | Penner et al. | 385/143 |
| 5,254,655 | 10/1993 | Gibbons et al. | 528/15 |
| 5,262,890 | 11/1993 | Berkovic et al. | 359/328 |
| 5,279,932 | 1/1994 | Miyasaka et al. | 430/495 |
| 5,283,685 | 1/1994 | Horsthuis | 385/122 |

METHOD OF MAKING BIOPOLYMER-BASED NONLINEAR OPTICAL MATERIALS

Part of the work leading to this invention was made under United States Government contracts with the National Aeronautics and Space Administration (NAS 8-39308) and the Department of Defense, United States Air Force (F33615-92-C-5944). The U.S. Government may have certain rights in this invention.

FIELD OF THE INVENTION

This invention relates to nonlinear optical materials, and more particularly to biopolymer-based films exhibiting nonlinear optical phenomena.

BACKGROUND OF THE INVENTION

Recent development of materials with large second and third order nonlinear optical (NLO) effects has generated interest in having application to future commercial electronic and telecommunication systems. Areas of application include optoelectronic interconnects to replace metal interconnects in computers for increased signal propagation rates and reduced crosstalk. The performance of spatial light modulators, used in most optical computing systems, is at present limited by the uniformity, reproducibility and cost of the nonlinear optical materials (NLOM) used in their manufacture. Another application of NLOM is in memory systems. NLOM have potential application in memory systems of reducing random access times and cost per stored bit while simultaneously increasing storage density. Finally, NLOM are of potential utility in protective sensors for the human eye, as well as in such applications as rangefinders, visual sensors and cameras.

The ideal nonlinear optical material for most applications would have a very large nonlinear response, extremely low switching thresholds and rapid switching times. NLOM for commercial applications should be inexpensive, mechanically tough, and formable into thin films. The materials should also be resistant to laser irradiation, chemicals, and temperature changes. Recently, organic and polymeric materials have been of particular interest due to their promising potential applications in optical information processing and telecommunications. This interest has arisen from the promise of attractive combinations of optical, structural, and mechanical properties. Organic and polymeric materials can exhibit considerably high optical damage thresholds compared with inorganics because the former are not as susceptible to the formation of F-centers. In addition, the ability to prepare numerous derivatives of organics implies that properties can be tuned to meet specific requirements. Because of their processability into various forms, polymers seem particularly attractive for applications requiring nonlinear optics.

Although various organic and inorganic materials exhibit rather large second and third order optical nonlinearities, the performance of some of these materials is limited by the uniformity, reproducibility, and cost of the nonlinear optical materials used in their manufacture. Polymers with large nonlinearities are particularly attractive because of their processability into useful forms such as fibers and films.

Mechanical shear has been demonstrated to induce molecular alignment in several polymers. Alignment of liquid crystalline polymers in solution by application of mechanical shearing stresses is accompanied by the development of banded structures oriented perpendicular to the direction of shear. It is also well known that electric fields have pronounced effects on polymer morphology. Liquid crystals are particularly susceptible to electric field-induced suprastructure modulation due to their anisotropic molecular dimension and the presence of dipoles in their chemical structures. Not only might molecules align in an electric field, but also transitions between different liquid crystalline states may be observed. Many liquid crystals can undergo transitions between mesomorphic phases, and electric or magnetic fields can induce such transitions. For example, with cholesteric liquid crystals, electric fields tend to align the molecules in the field direction. However, at sufficiently high field strengths, a transition to nematic order can occur.

Biopolymers offer an attractive combination of structural and mechanical properties which supports optical nonlinearity. Poly-($\gamma$-benzyl-L-glutamate), PBLG, is known to form helical structures when dissolved in an appropriate helicogenic (helix-inducing) solvent. Further, the helices align in solution to form aggregates of higher order (liquid crystals). These structures, and films formed which capture these structures, are non-centrosymmetric, that is, they do not possess a center of inversion, and hence give rise to nonlinear optical responses. To the extent that both the degree of helicity and the extent of molecular alignment is increased, NLO responses are expected to increase.

Polypeptides which are characterized by helical structures are, at the molecular level, non-centrosymmetric. However, in randomly oriented polypeptide films, as might be obtained by solvent evaporation in the absence of an applied field, non-centrosymmetry is lost and the sample does not exhibit nonlinear optical properties such as second harmonic generation (SHG). Alignment of the molecular helices by application of an electric field perpendicular to the solution with simultaneous evaporation of the solvent yields SHG-active films with relaxation times reported to be at least six months.

Donald et al. (Polymer 24:155–159 (1983); J. Mat. Sci. 18:1143–1150 (1983)) reported banded structures formed by several thermotropic polymers oriented by shear at temperatures above their softening points. Similar structures were also noted in fibers drawn from rigid backboned polyesters above the softening points. Toth and Tobolsky (Polymer Letters 8:531–536 (1970) applied electric fields perpendicular to 15% solutions of PBLG in chloroform and noticed the emergence of dark fields in previously birefringent solutions. Upon slight shearing birefringence reappeared as multicolored bands perpendicular to the shear direction. Toth and Tobolsky (Polymer Letters 8, p. 531 (1970)) indicated that the disappearance of the birefringence was due to a perpendicular orientation of the solute molecules with respect to the plane of the film which reverted to an in-plane orientation upon shear. Similar banded structures have been observed upon application of a magnetic field of approximately 9600 Gauss oriented parallel or perpendicular to the surface of a 15% solution of PBLG in methylene dibromide.

Kiss and Porter (Mol. Cryst. Liq. Cryst. 60:267–280 (1980)) observed the transverse striations in a rheooptical study of sheared solutions of about 14 wt % PBLG in m-cresol. Kiss and Gabor indicate that molecules within the striae are oriented at 45° to the direction of shear and suggest that the striae form planes about 10–30 microns in width which traverse the entire sample volume.

SUMMARY OF THE INVENTION

The invention relates to a new method of manufacturing biopolymer films and other materials that exhibit nonlinear optical (NLO) properties. The method exploits the fact that noncentrosymmetric biopolymers with an a-helical conformation may be aligned in an electric field which is parallel to the surface of a biopolymer solution. After evaporation of the solvent, the cast biopolymer film materials display nonlinear optical properties, such as second harmonic generation.

Prior to alignment, the random orientation of biopolymer molecules in a solution effectively results in centrosymmetry and cancellation of any NLO activity. Alignment of biopolymer molecules is achieved by application of an electric field parallel to the surface of the biopolymer solution. In one embodiment, a solution of poly(γ-benzyl-L-glutamate), PBLG, in methylene chloride is employed. Methylene chloride is a helicogenic solvent in which PBLG exists in an α-helical conformation. The dipoles associated with the polar moieties of molecular residue are cumulatively directed along the molecular axis (i.e., the long axis of the helix). Application of an electric field induces the polymers to become ordered parallel to each other and also to assume a characteristic orientation with respect to the applied electric field.

The ordered laminar structures are captured as a film upon evaporation of the biopolymer solvent. The biopolymer films produced by the method of the invention display a regular banded structure with potential application in the production of various sheet materials, such as diffraction gratings.

DESCRIPTION OF THE DRAWINGS

The invention will be more fully understood from the following detailed description taken in conjunction with the accompanying drawings in which.

DETAILED DESCRIPTION OF THE INVENTION

Figure 1:
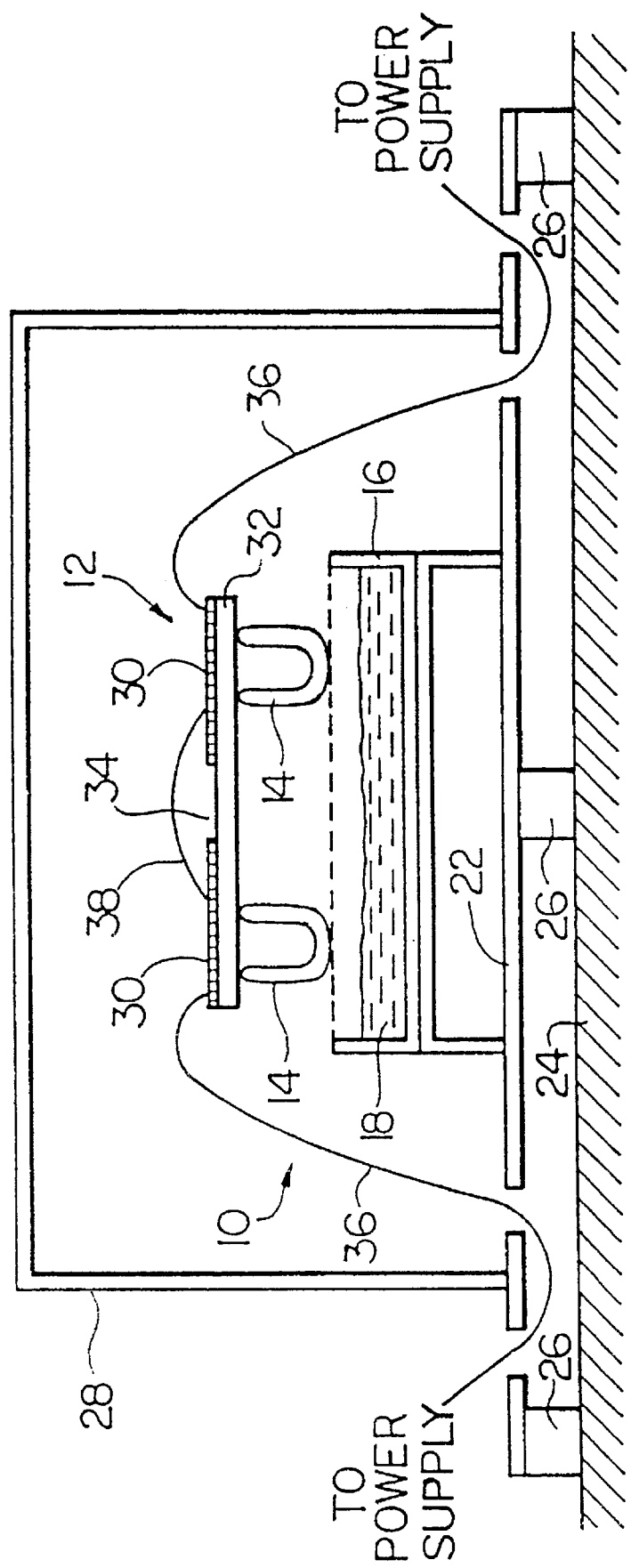
FIG. 1 is a schematic view of an embodiment of an the apparatus used to form the NLO films of the invention.

Solutions of polymers are prepared by dissolving dry polymer powder in an appropriate solvent. Biopolymers that form α-helical structures in solution are preferred because the geometry of the α-helix permits dipoles to form and allows the helices to pack in an ordered manner. Poly (γ-benzyl-L-glutamate), PBLG, a polypeptide biopolymer with a known helical configuration, has dipole moments due both to hydrogen bonds directed along the helical axis and to zwitterionic charges at the chain ends. Lacking centrosymmetry, the molecule can exhibit nonlinear optical properties, such as second harmonic generation (SHG), characterized by a doubling of the frequency of essentially monochromatic laser light transmitted through the material. However, in unaligned samples, molecules are randomly oriented and non-centrosymmetry in the bulk is lost. Such samples, effectively centrosymmetric, do not exhibit nonlinear optical properties.

Solutions of PBLG of molecular weights of 10 kDa or greater are dissolved in an appropriate helicogenic solvent. Methylene chloride is a preferred helicogenic solvent because it is both a good solvent for PBLG and has a high vapor pressure to allow rapid evaporation during film casting. In some cases, however, rapid evaporation may be accompanied by convective flow which could perturb the alignment pattern of the molecules. In such cases, solutions with lower vapor pressures, such as dimethyl formamide, pyridine, and dioxane may be utilized. These solutions promote and preserve the helical conformation of the polymer, yet do not evaporate as rapidly as methylene chloride. As discussed in more detail below, the voltage and gap width may also be chosen to slow the evaporation and produce a more uniform film.

In alternative embodiment, PBLG monomers may be nitrated and polymerized to yield poly(γ-p-nitrobenzyl-L-glutamate). Poly(γ-p-nitrobenzyl-L-glutamate) polymers are also capable of forming aligned structures when subjected to an electric field. Biopolymers such as PBLG may be derivatized with a variety of functional groups, such as nitro, chosen to enhance the NLO effect. The monomer γ-p-nitrobenzyl-L-glutamate may be synthesized by the selective esterification of L-glutamic acid with p-nitrobenzyl alcohol, the reaction being catalyzed by p-tolulenesulfonic acid.

In an exemplary embodiment, L-glutamic acid (0.014 mol), p-nitrobenzyl alcohol (0.014 mol), and p-tolulenesulfonic acid monohydrate (0.018 mol) are stirred and refluxed in benzene for 3 hrs, while water is removed by azeotropic distillation. After cooling, ethyl ether (140 ml) is added and a light yellow solid is isolated after cooling in a refrigerator overnight and washing with ethyl ether. After filtration, 0.011 mol of p-nitrobenzylglutamate tolulene-sulfonic acid is obtained. Decomposition of the p-TosOH salt of the desired ester is performed by the addition of triethylamine (0.011 mol) to chloroform mixture of the salt at 0°–5° C. After 15 min. stirring, ethyl ether (130 ml) is added, and the resulting solid is collected and recrystallized from boiling water (200 ml). The yield is approximately 2.0 g of a white solid.

Purification of the ester is carried out by heating it in water (100 ml) with copper (II) acetate monohydrate (8.6 mmol) at 80° C. for 15 min. A violet precipitate is formed and the resulting mixture is filtered by suction. The violet copper complex is decomposed by boiling in an ethylene-diaminetetraacetic acid (EDTA) disodium salt dihydrate (5.33 g) solution in water for about 10 min (150 ml, pH 4.5). Filtration of the resulting solution and cooling gives a crystalline solid. The crystalline solid is then dissolved in hot water along with the addition of some charcoal, and the mixture is kept at 90° C. for 10 min. After filtration, white crystals are separated from the water solution. The product, γ-p-nitrobenzylglutamate, can be characterized by IR spectrometry, melting point, and optical rotation and compared with that reported in the literature for the amino acid derivative.

Poly(γ-p-nitrobenzylglutamate) is synthesized from the monomer. To a solution of the γ-p-nitrobenzylglutamate (1.77 mmol) in 1.0 ml of DMSO and 0.74 ml of triethylamine is added 0.57 ml of diphenyl phosphoryl azide (DPPA) at 10° C. The mixture is stirred at 0° C. for 1 hr and then at room temperature for 48 hrs. Another 0.57 ml of DPPA and 0.74 ml of triethylamine are added at 0° C. The mixture is further stirred at 0° C. for 1 hr and then at room temperature for 48 hrs. The polymer is precipitated by the addition of water/methanol (1:1, v:v) with vigorous stirring. After filtration, the precipitate is washed with water three times, methanol three times and ethyl ether once. The solid is dried in air to yield 0.4 g of a yellow solid. The final polymer was characterized by IR and elemental analysis as follows: IR (cm$^{-1}$, KBr film) 3500–2500, 3400, 3020, 1720, 1650, 1600, 1510, 1440, 1340, 1150, 1100; anal. calc. from $(C_{12}H_{12}N_2O_5 \cdot 0.1\ H_2O)_n$: C%, 54.18; H%, 4.51; N%, 10.53.

An embodiment of an apparatus used to produce films of the invention is illustrated in FIG. 1. The apparatus, shown in overview at 10, includes an electrode slide 12 supported by ceramic blocks 14 and enclosed by a container 28, such as a crystallizing dish. The ceramic blocks 14 rest on shallow container 16, such as a Petri dish, containing a solvent 18. The solvent serves to slow evaporation during casting by providing a saturated atmosphere. The apparatus 10 is enclosed by the container 28 to prevent air currents and to slow evaporation of solvent from the slide by increasing the solvent vapor pressure in the chamber. Alternatively, the apparatus 10 may be open to the air. The shallow container 16 is positioned on a plexiglass plate 22 which is mounted to a work surface 24 by rubber blocks 26.

The electrode slide 12 includes a pair of electrodes 30 mounted on opposite ends of a glass microscope slide 32. Electrodes 30 are attached to the microscope slide 32 by vapor deposition of aluminum onto the microscope slide surface. In an exemplary embodiment, the glass microscope slide is 3"×1"×1.2 mm in size with the electrodes 30 positioned at each end, and a gap 34 of 0.1 to 0.5 cm between the electrodes 30. In preparation for deposition of the electrodes, the microscope slide 32 is first washed with ethanol, followed by a 2:1 volume mixture of concentrated sulfuric acid plus 30% hydrogen peroxide. The slide 32 is then rinsed copiously with deionized water, and dried with dry, filtered nitrogen gas.

The electrode gap 34 between the electrodes 30 is made by wrapping strips of material, such as stainless steel, around the width of the slide 32 so as to leave the ends of the slide exposed for electrode deposition. In an exemplary embodiment, the strips are cut to approximately 0.5 cm in width with a paper shear and cleaned by sonication in acetone. The strips serve as a mask during deposition of metal to prevent deposition of metal in what will become the electrode gap 34. The gap width may be changed to suit individual application parameters. In an alternative embodiment, a gap width of approximately 0.1 cm allows the use of lower voltages and the large ratio of the electrode edge length to gap width which provides a virtually parallel electric field near the center of the electrode by minimizing fringing effects.

The slide 32 is then mounted in an electronic evaporator and coated with aluminum (99.999% pure) to a final coating thickness of approximately 1.1 microns. After deposition and removal of the strips of material, the gap appears under microscopic examination to be straight and sharply defined. This process may be repeated as new electrodes were required. In an alternative embodiment, electrodes may be prepared by a photoresist technique which gives better control of the electrode gap width and evenness of the metallic edge.

Once the electrode slide 12 is mounted in the apparatus 10, electrodes 30 are connected to a power supply (not shown) by leads 36. Alligator clips padded with aluminum foil may be used to insure good electrical contact between the leads and the aluminum of the electrode. A solution of polymer 38 is placed between the electrodes 30.

Figure 2:
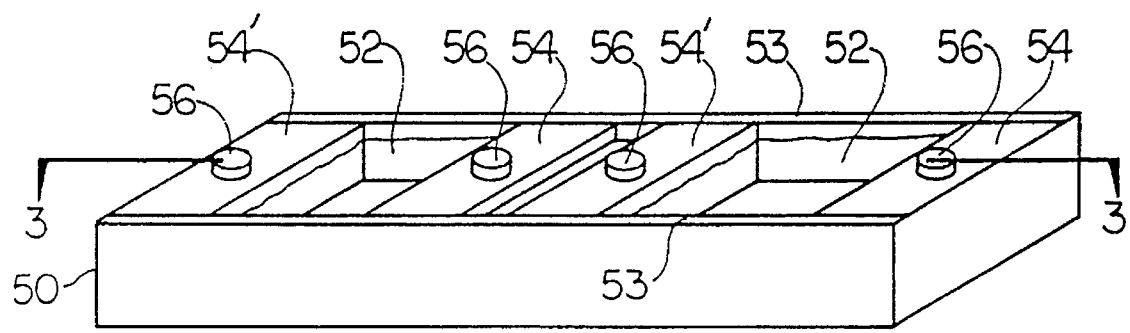
FIG. 2 is a perspective view of an alternative embodiment of the apparatus of the invention.
Figure 3:
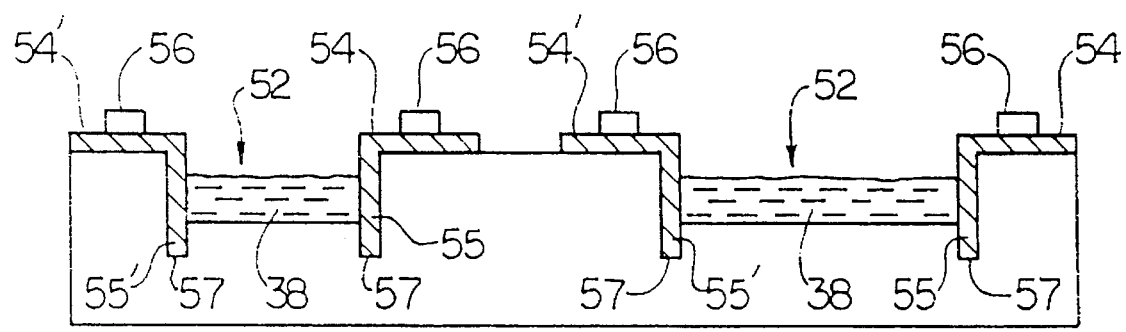
FIG. 3 is a cross-sectional view of the alternative embodiment of the apparatus of the invention shown in FIG. 2, as taken through plane A–A'.

In an alternative embodiment, the electrode design illustrated in FIG. 2 may be implemented. In this embodiment, a TEFLON® (polytetrafluoroethylene resin) block 50 is manufactured so that its upper surface contains at least one rectangular reservoir 52. A groove 57 is machined into the floor of the reservoir 52 at each end of the reservoir. Electrodes 54, 54' are positioned in the grooves 57 in the resevoir 52, separated by a distance determined by the specific dimensions of the film to be produced. As illustrated in FIG. 3, the vertical portion 55, 55' of each of the electrodes 54, 54' fit into their respective groove 57 at the end of the resevoir 52 and extend below the floor of the resevoir. The solution 38 is in contact with the electrodes 54, 54' at approximately the midpoint, permitting the solution 38 to be exposed to a more homogeneous electric field than if the bottom edge of the electrode were in the plane of the depression. Electrode leads 56 permit connection of the electrodes 54, 54' to a power source (not shown).

In one embodiment, a TEFLON® (polytetrafluoroethylene resin) block of approximately 0.5" (H)×3.75" (L)×1.0" (D) is machined to include depressions of approximately 0.0625" in depth and 0.781" in width. The distance between the electrodes 54, 54' may vary from 0.5" (1.27 cm) to 2.5" (6.35 cm). The electrodes 54, 54' may be fashioned of copper, or other conductive non-reactive metal such as silver or platinum.

Solutions of PBLG polymers at concentrations of approximately 20 mg/ml were made, and each polymer solution was applied by pipette to cover the electrode gap 34 as well as a portion of the aluminum electrode. The volume of solution applied may be chosen by the user according to the specific parameters of the film that is to be produced, such as desired thickness. Films of polypeptides are prepared in electric fields of up to 10,000 volts/cm positioned parallel to the surface of a thin layer of solution. In one embodiment, a McPherson Model 752 Detector Supply unit adjustable from 0 to 5.0 kV DC is used as the power source.

The time required for formation of solid films depends on whether the film was made in a container saturated with solvent vapor or exposed to air, as well as on the field strength and volume of solution. Using a glass slide electrode in open air, approximately 0.5 ml of 20 mg/ml PBLG solution in methylene chloride, and a field strength of approximately 10 kV/cm, films were formed in less than one minute. In a closed environment at low field strength (approx. 0.8 kV/cm) with 2 ml of solution, film formation requires approximately 20 minutes.

Figure 4:
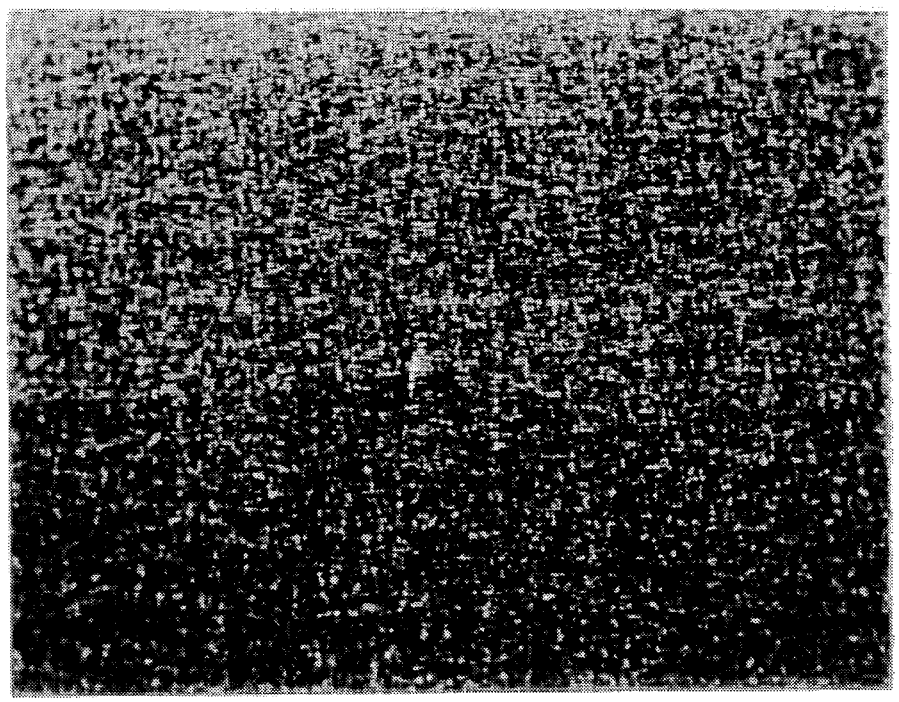
FIG. 4 is a photograph of a film made by the method of the invention using 20.1 kDa PBLG polymer and no applied electric field.
Figure 5:
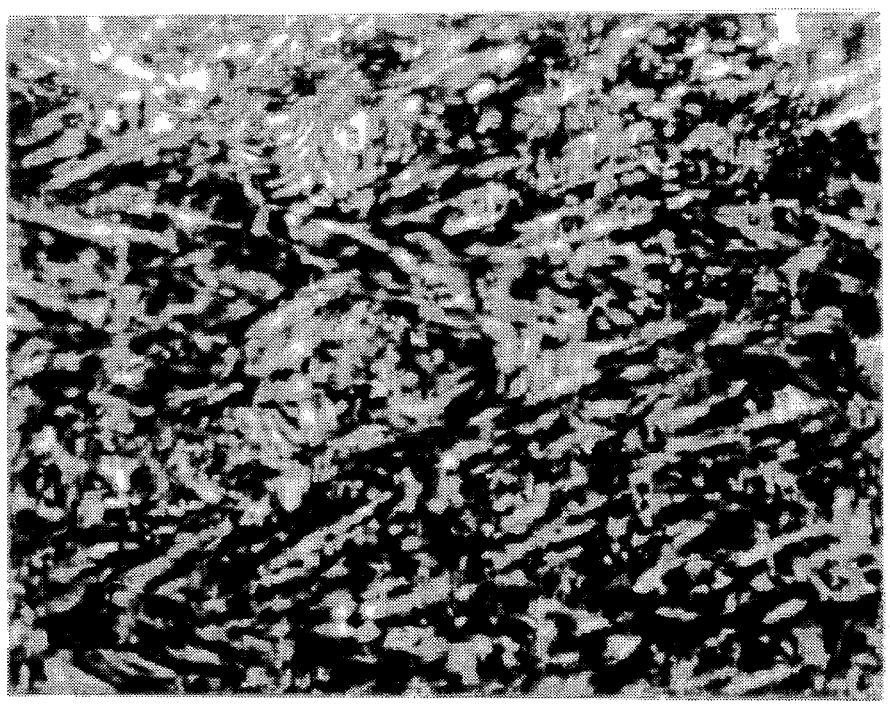
FIG. 5 is a photograph of a film made by the method of the invention using 20.1 kDa PBLG polymer and a 9.4 kV/cm electric field.

The films produced by the method of the invention are examined by polarized light microscopy and scanning electron microscopy. FIG. 4 is a photograph of a low molecular weight (20.1 kDa) PBLG film with no electric field applied and prepared under the same conditions as films made in the presence of a field. The absence of birefringence patterns in FIG. 4 suggests an amorphous structure characterized by small non-crystalline domains. FIG. 5 shows a film of the same material but made in the presence of a field of 9.4 kV/cm. The birefringence resembles a "herringbone" pattern oriented about 45° to the field.

PBLG in its helical conformation, as is expected in methylene chloride solution, has dipoles due to hydrogen bonds directed parallel to the helical axis as well as a molecular dipole arising from oppositely charged ends (ammonium and carboxylate ions). Thus orientation of the molecular helices is parallel to the applied field and should therefore be nearly perpendicular to the direction of the surface striae and perhaps inclined at 45° to the herringbone-like crystallinity.

Figure 6:
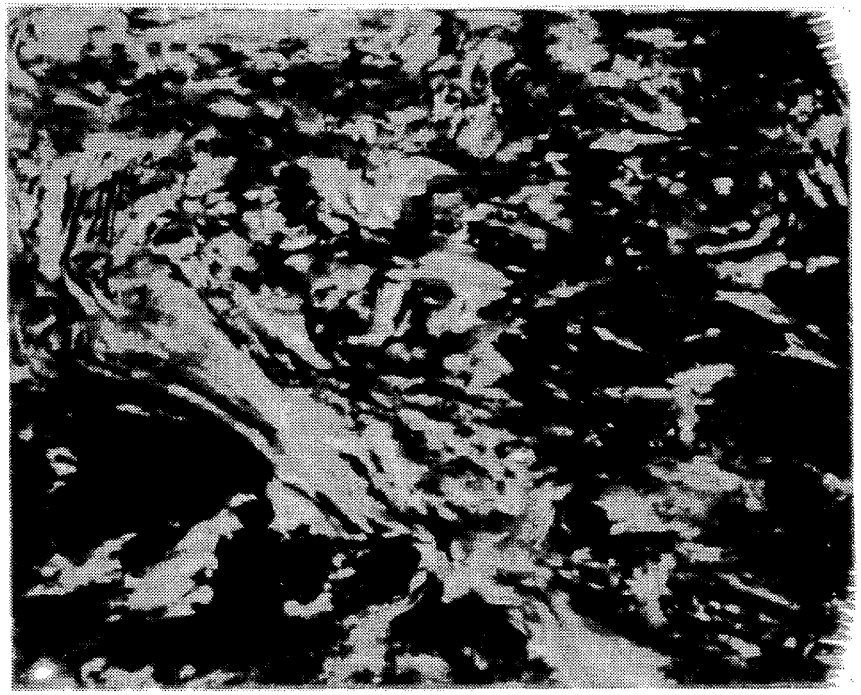
FIG. 6 is a photograph of a film made by the method of the invention using 236 kDa PBLG polymer and a 10.2 kV/cm electric field.

FIG. 6 is a photograph of PBLG film of high molecular weight (236 kDa) cast in a 10.2 kV/cm field. Again, strong birefringence indicates crystallinity, with less obvious orientation of the crystallites, but still with some suggestion of 45° alignment. The upper left of this photograph contains a group of dark parallel lines oriented almost 90° to the field. This may be related to the structures observed in the scanning electron micrographs and photomicrographs which show definite structure perpendicular to the field direction.

Figure 7:
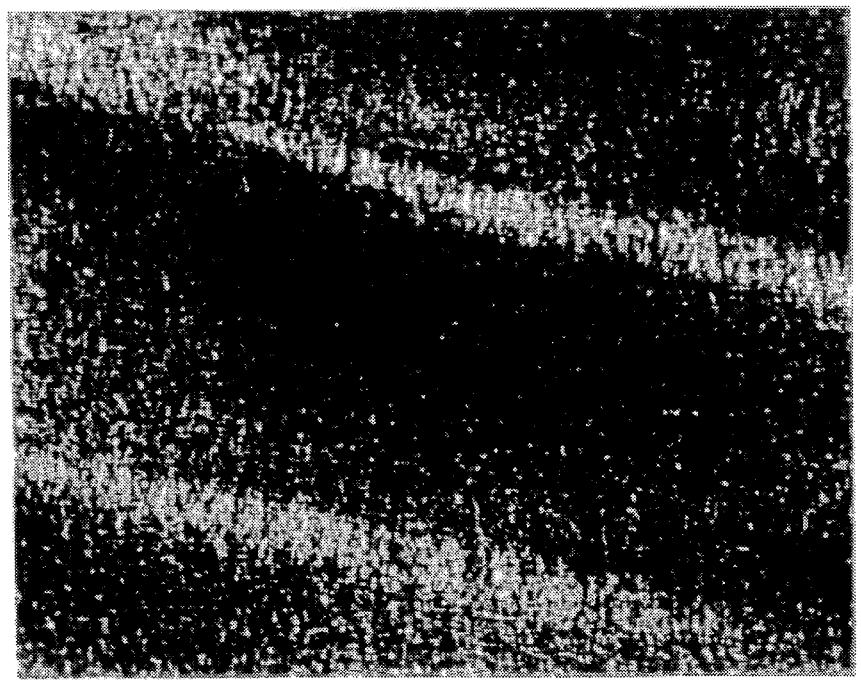
FIG. 7 is a photomicrograph of a film made by the method of the invention using poly(nitrobenzyl-L-glutamate) and no applied electric field.
Figure 8:
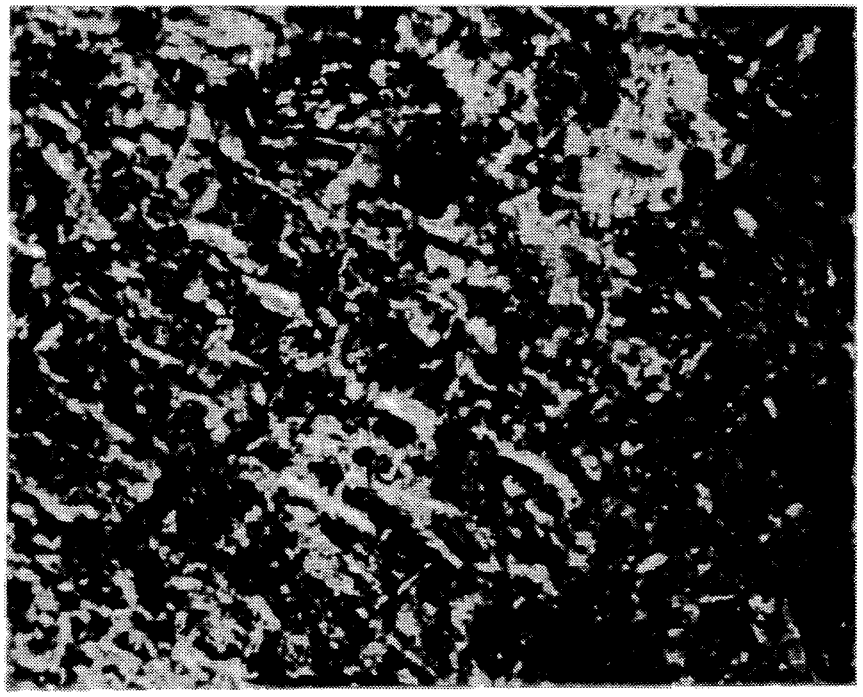
FIG. 8 is a photomicrograph of a film made by the method of the invention using poly(nitrobenzyl-L-glutamate) and a 9.3 kV/cm electric field.

FIGS. 7 and 8 are photomicrographs of films of poly(nitrobenzyl-L-glutamate) cast at 9.3 kV/cm and no electric field, respectively. The film cast in the absence of an electric field (FIG. 8) shows no birefringence and a grainy structure. In contrast, the film cast in the presence of an electric field (FIG. 7) has a structure similar to that of the unsubstituted low molecular weight PBLG. These results suggest that the low molecular weight PBLG experiences more facile alignment in an electric field than does the high molecular weight polymer, and that substitution with a polar nitro group on the benzene ring may also facilitate alignment.

Film formation is much more rapid in the presence of a field than in its absence due, perhaps, to heating effects. The solution between the electrodes exhibits a rapid wave like motion perpendicular to the field direction which is termed electroconvection. At higher electric field strengths, electroconvection may result in the solvent being evaporated too quickly and the cast film having irregularities in its structure. Electroconvection should be minimized to produce a film with uniform thickness and may be achieved by slowing the rate of solvent evaporation during alignment by insuring an atmosphere around the film which is saturated with solvent and by cooling the cell.

A second series of PBLG films were prepared in varying electric fields to examine the effect of field strength on film morphology. These films were studied by scanning electron micrograph (SEM) analysis as well as by polarized light optical microscopy at higher magnification than used for films previously described. SEMs were taken at a higher magnification of 2000, 2400, and 5750 times, using an accelerating voltage of 10 kV and an axis tilt of 35°. Optical microscopy was performed on low molecular weight PBLG films prepared at field strengths of 0, 1.2, 2.8, 5.0, 7.0 and 10.9 kV/cm and examined at magnifications of 132, 264, or 528 times.

Figure 9:
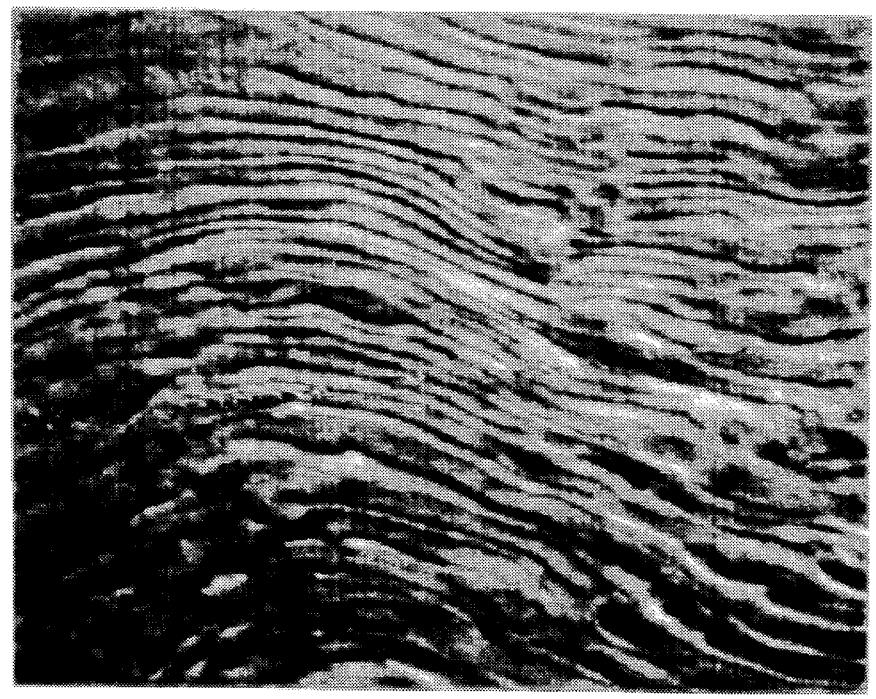
FIG. 9 is a scanning electron micrograph (2400X) of a film made by the method of the invention using 248 kDa PBLG polymer and a 10.4 kV/cm electric field.

FIG. 9 is a scanning electron micrograph of high molecular weight PBLG film prepared in a 10.4 kV/cm field. This film displays a definite striated surface pattern oriented approximately 90° to the field direction. The width of the striae are about 0.9–1.5 microns.

Figure 10:
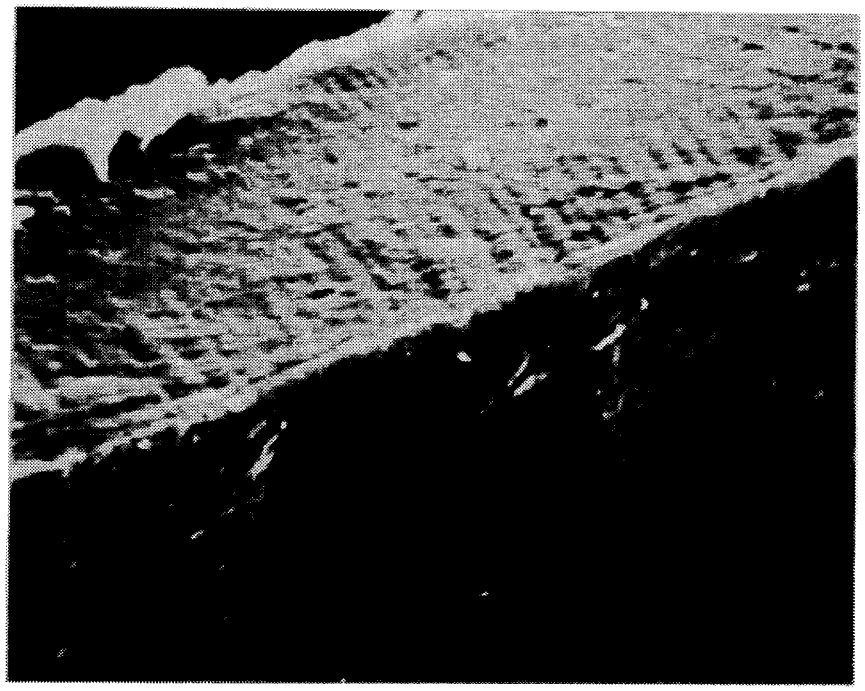
FIG. 10 is a scanning electron micrograph (2400X) of an edge of a film made by the method of the invention using 20.1 kDa PBLG polymer and a 10.4 kV/cm electric field.
Figure 11:
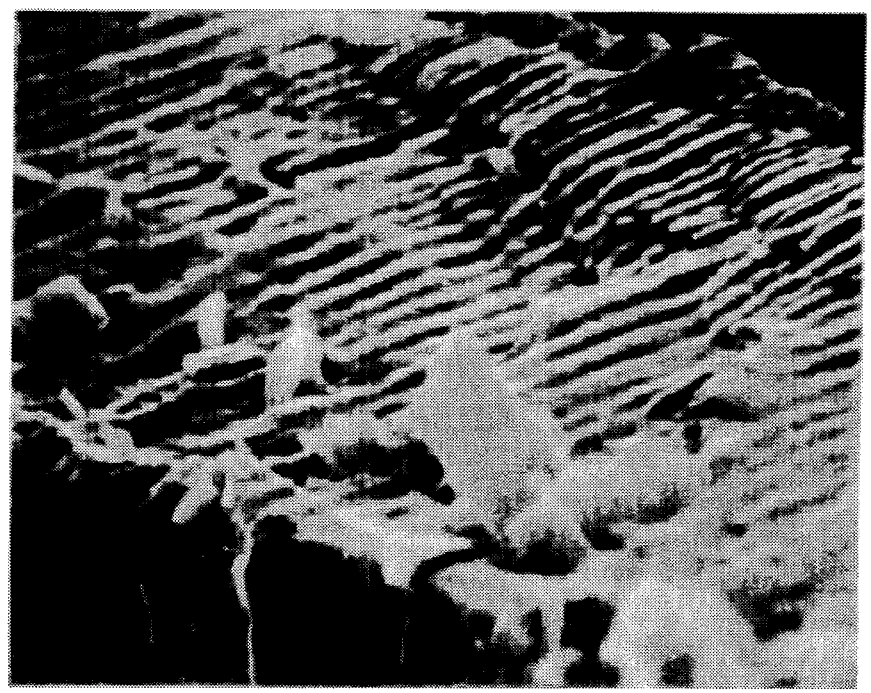
FIG. 11 is a scanning electron micrograph (5750X) of an edge of a film made by the method of the invention using 20.1 kDa PBLG polymer and a 10.4 kV/cm electric field.
Figure 12:
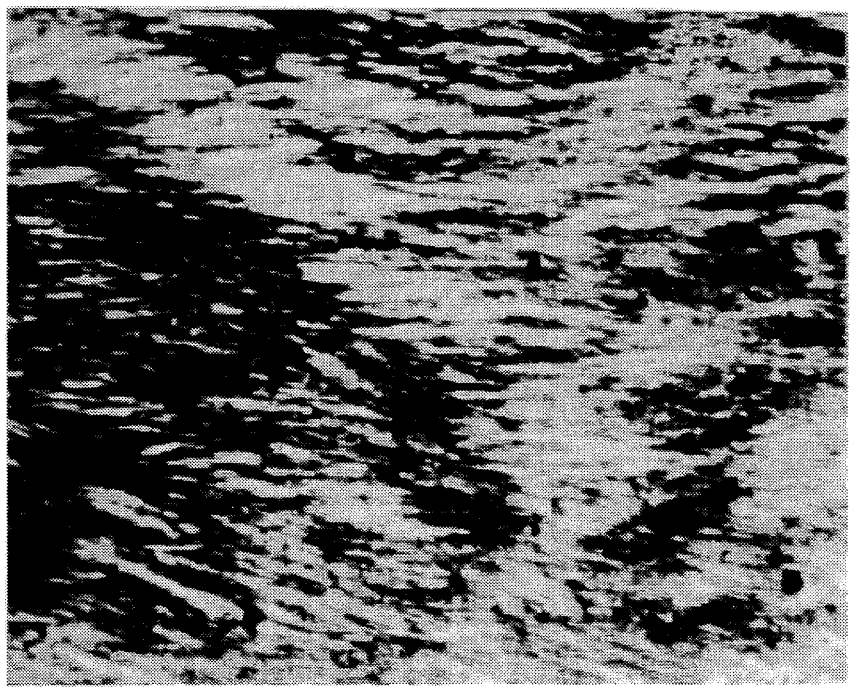
FIG. 12 is a photomicrograph of a film made by the method of the invention using 20.1 kDa PBLG polymer and a 1.2 kV/cm electric field.
Figure 13:
FIG. 13 is a photomicrograph of a film made by the method of the invention using 20.1 kDa PBLG polymer and a 2.8 kV/cm electric field.
Figure 14:
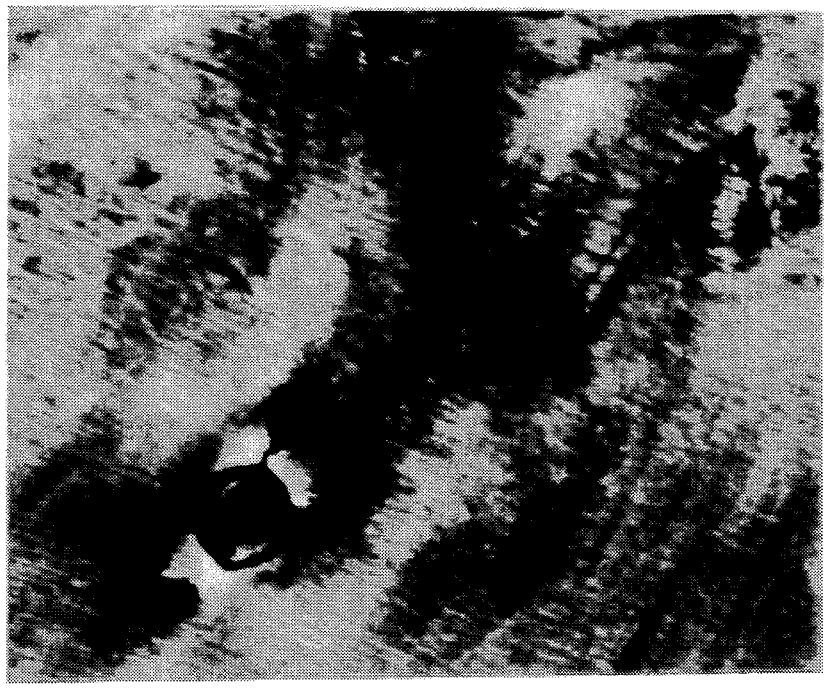
FIG. 14 is a photomicrograph of a film made by the method of the invention using 20.1 kDa PBLG polymer and a 5.0 kV/cm electric field.
Figure 15:
FIG. 15 is a photomicrograph of a film made by the method of the invention using 20.1 kDa PBLG polymer and a 7.0 kV/cm electric field.
Figure 16:
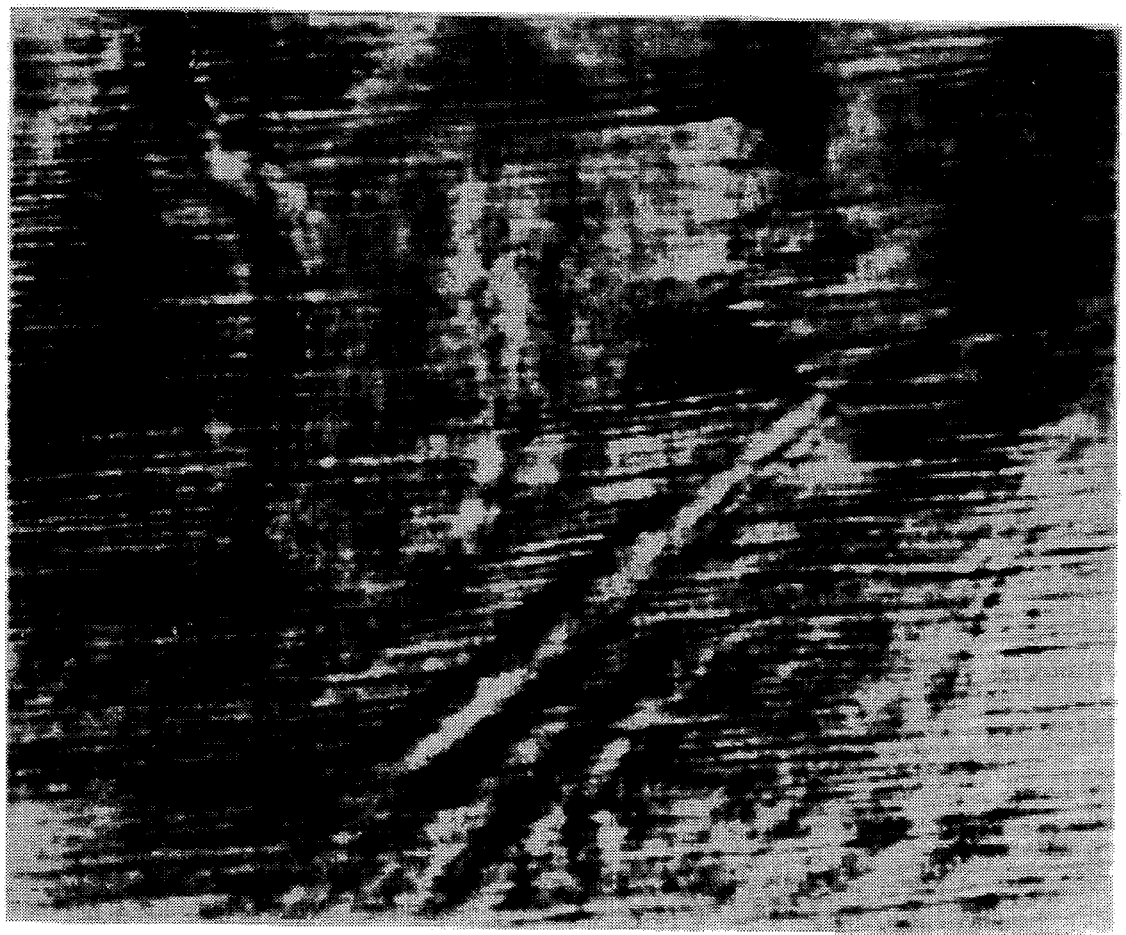
FIG. 16 is a photomicrograph of a film made by the method of the invention using 20.1 kDa PBLG polymer and a 10.4 kV/cm electric field.

FIGS. 10 and 11 illustrate that these pattern are not restricted to the surface of the films. Films were cooled in liquid nitrogen to rigid brittleness and then manually cracked. The SEMs show that the surface ripples are manifestations of what appears to be a laminar internal structure. The laminae are perpendicular to the film surface as well as to the direction of the applied field.

Striae perpendicular to the field direction is also seen in the optical photomicrographs at high magnification. FIGS. 12 through 16 show stages in alignment of PBLG (molecular weight= 20.1 kDa) films cast from methylene chloride in fields of 1.2, 2.8, 5.0, 7.0 and 10.4 kV/cm. At 1.2 and 2.8 kV/cm (FIGS. 12 and 13) a parallel alignment is developing but the aligned domains are relatively short. At 5.0 kV/cm (FIG. 14) the striae perpendicular to the field are clearly lengthened. At 7.0 and 10.4 kV/cm (FIGS. 15 and 16) the striae appear as long parallel bands extending across the film. In all cases the bands are oriented perpendicular to the direction of the applied field.

The films cast using the above techniques were studied to determine their respective nonlinear optical properties. The Kurtz technique, in which laser induced emission is detected with a photomultiplier tube, provided a convenient method for screening materials for second order nonlinear optical activity. SHG efficiencies normalized to urea or potassium dihydrogen phosphate (KDP) were determined at 532 nm using the 1064 nm fundamental output of a Q-switched Nd:TAG laser (Quanta-Ray DCR-24). Stray light from the laser is eliminated by passing the incident beam through a Corning 7-54 filter. The 532 nm second harmonic is measured in the forward direction by being filtered through two Schott ka-1 filters and the second harmonic measured using a McPherson 0.2M monochromator with a cooled RCA C31034 photomultiplier tube.

Due to the structurally anisotropic nature of the ordered polymers, samples are mounted on a rotation stage between the focusing lens and the entrance slits of the monochromator. The sample is rotated from 0 to 90 degrees with respect to normal incidence for the laser beam. The SHG signal is measured in transmission.

A single crystal quartz reference is used as a standard in determination of second-order macroscopic susceptibilities $\chi^{(2)}$. A 0.5 mm thick, y-cut, single crystal quartz plate is placed on the rotation stage and rotated about the horizontal axis and the incident laser beam perpendicular to this rotation axis. The quartz standard is rotated through angles of incidence from −35 degrees to 35 degrees.

The $\chi^{(2)}$ tensor component magnitudes for quartz are well characterized for an incident laser beam near the fundamental wavelength of 1064 nm. The $\chi^{(2)}_{333}$ tensor component for quartz is an accepted standard. As the quartz standard is rotated about the optic axis of the crystal, the maximum of the largest Maker fringe is found near normal incidence of the incidence laser beam used as a measure of $\chi^{(2)}_{333}$ for quartz.

Calculation of second order susceptibilities ($\chi$ values) depends on measurements of film thickness and refractive indices at both wavelengths (1064 and 532 nm). The thickness of a low molecular weight PBLG film was 64 μm as measured by a micrometer. The refractive indices were measured as $n_\omega$=1.602 and $n_{2\omega}$=1.702. The calculated susceptibility, $\chi^{(2)}_{333}$ (abs) was 1.6 (±0.06)×10⁻⁸ esu. From these results, electric field alignment clearly enhances SHG signals. The control films (low molecular weight PBLG at zero field), in contrast to the films produced in the presence of an electric field, did not give a signal.

PBLG films aligned in electric fields show strong birefringence when examined microscopically through crossed polarizers with aligned domains suggesting a herringbone pattern oriented at approximately 45° to the field direction. The regularity of alignment was more evident in the PBLG films of lowered molecular weight (20.1 kDa). Birefringence and alignment were not observed in any of the control films (0-field).

Scanning electron micrograph examination of electric field aligned films revealed a wave-like surface structure perpendicular to the field direction. This structure continues through the film as seen in edge views, appearing as a laminar arrangement. Measurements of second harmonic generation indicated that all of the electrically aligned films produced signals; no signals were detected from the 0-field controls.

The non-linear second order susceptibility of lower molecular weight PBLG (20.1 kDa) was measured as 1.60 (±0.06)×10⁻⁸ esu. This compares quite favorable with standards such as quartz, potassium dihydrogen phosphate (KDP), and ammonium dihydrogen phosphate. Values of $\chi^{(2)}$ for PBLG as reported herein and for several other materials as reported in the literature are given in Table 1.

Electric field alignment of PBLG is capable of enhancing the NLO properties of this polypeptide. Derivatization of PBLG with suitable chromophores, or refinements in film preparation may further increase the response. Film quality is apparently affected by the electroconvection phenomenon.

Although the invention has been shown and described with respect to an illustrative embodiment thereof, it should be appreciated that the foregoing and various other changes, omissions and additions in the form and detail thereof may be made without departing from the spirit and scope of the invention as delineated in the claims.

TABLE 1

SECOND ORDER SUSCEPTIBILITIES FOR SEVERAL MATERIALS

| Material | λ, nm | Coordinate | $\chi^{(2)}$, esu |
|---|---|---|---|
| PBLG[1] | 1064 | — | 1.60(±0.06) × 10⁸ |
| Quartz[2] | 1060 | xxx | 0.191 × 10⁸ |
| KDP[3] | 1060 | xys | 0.234 × 10⁸ |
| KDP | 1060 | syx | 0.224 × 10⁸ |
| ADP[4] | 694 | xys | 0.229 × 10⁸ |
| ADP | 694 | syx | 0.232 × 10⁸ |
| LiNbO[5] | 1060 | sss | 19.4 × 10⁸ |
| BaTiO₃[6] | 1060 | sxx | −8.59 × 10⁸ |
| ZnS[7] | — | — | 1.7 × 10⁷ |
| GaAs[8] | — | — | 18(±8) × 10⁷ |
| GaAs | — | — | 9 × 10⁷ |

[1] Poly(benzyl-L-Glutamate), MW = 20.1 kDa
[2] α-silicon dioxide
[3] Potassium Dihydrogen Phosphate
[4] Ammonium Dihydrogen Phosphate
[5] Lithium Niobate
[6] Barium Titanate
[7] Zinc Sulfide
[8] Gallium Arsenide

We claim:

1. A method of producing a biopolymer film exhibiting nonlinear optical activity comprising the steps of:

providing a biopolymer solution comprising a biopolymer in a helicogenic solvent, said biopolymer having a molecular weight in the range of approximately 10 kDa to approximately 236 kDa and forming an α-helical structure in said biopolymer solution;

dispensing said biopolymer solution between a pair of electrodes, said biopolymer solution having a surface; and applying an electric field between said electrodes and parallel to said surface of said biopolymer solution to thereby orient said biopolymer with respect to said electric field, said solvent evaporating upon said application of said electric field to form a biopolymer film exhibiting nonlinear optical activity.

2. The method of claim 1, wherein said biopolymer is poly(γ-benzyl-L-glutamate).

3. The method of claim 1, wherein said biopolymer is poly(nitrobenzyl-L-glutamate).

4. The method of claim 1, wherein said nonlinear optical activity comprises second harmonic generation.

5. The method of claim 1, wherein said helicogenic solvent is methylene chloride.

6. The method of claim 1, further comprising using a gap between said pair of electrodes, said gap being in the range of approximately 0.1 cm to 6.35 cm.

* * * * *